(12) United States Patent
Glinert

(10) Patent No.: US 7,338,158 B2
(45) Date of Patent: Mar. 4, 2008

(54) EYEGLASSES DEVICE

(76) Inventor: Robert Glinert, 10 E. Newhaven Cir., Madison, WI (US) 53711

( * ) Notice: Subject to any disclaimer, the term of this patent is extended or adjusted under 35 U.S.C. 154(b) by 0 days.

(21) Appl. No.: 11/297,896

(22) Filed: Dec. 8, 2005

(65) Prior Publication Data

US 2007/0132939 A1    Jun. 14, 2007

(51) Int. Cl.
*G02C 1/00* (2006.01)
(52) U.S. Cl. ............................. 351/158; 206/5; 24/3.3
(58) Field of Classification Search ................. 351/41, 351/63, 158; 206/5, 6; 24/3.1, 3.3, 3.8
See application file for complete search history.

(56) References Cited

U.S. PATENT DOCUMENTS

| | | | |
|---|---|---|---|
| 1,158,169 A * | 10/1915 | Bradley et al. ................. 24/13 |
| 1,240,536 A * | 9/1917 | Bradley et al. ................. 24/13 |
| 1,427,947 A | 9/1922 | Flitton |
| 1,715,348 A | 6/1929 | Barbara |
| 4,401,209 A | 8/1983 | Salmond et al. |
| 4,953,695 A * | 9/1990 | Tallman ......................... 206/5 |
| 5,014,846 A | 5/1991 | Walker et al. |
| 5,151,778 A | 9/1992 | Conley |
| D332,525 S | 1/1993 | Ogata |
| 5,240,105 A | 8/1993 | Tsai |
| 5,366,072 A | 11/1994 | Goldenberg |
| 2004/0118706 A1 * | 6/2004 | Hasenfrantz ................... 206/6 |

* cited by examiner

*Primary Examiner*—Huy K Mai
(74) *Attorney, Agent, or Firm*—Casimir Jones, S.C.

(57) ABSTRACT

The present invention relates to eyeglasses and containers for securing eyeglasses. In particular, the present invention relates to a device comprising an eyeglasses segment attached to an eyeglasses container, and related systems and kits.

9 Claims, 1 Drawing Sheet

EYEGLASSES DEVICE

FIELD OF THE INVENTION

The present invention relates to eyeglasses and containers for securing eyeglasses. In particular, the present invention relates to a device comprising an eyeglasses segment attached to an eyeglasses container, and related systems and kits.

BACKGROUND

Reading eyeglasses are commonly used among people over the age of 30. Many people who use reading eyeglasses only use them when reading. As such, reading eyeglasses are easily misplaced. What is needed is an improved eyeglasses design that prevents the misplacement of the eyeglasses.

SUMMARY OF THE INVENTION

The present invention relates to eyeglasses and containers for securing eyeglasses. In particular, the present invention relates to a device comprising an eyeglasses segment attached to an eyeglasses container, and related systems and kits.

In certain embodiments, the present invention provides a device, comprising an eyeglasses segment, an eyeglasses container segment, and a linking segment connecting the eyeglasses segment and the eyeglasses container. In preferred embodiments, the eyeglasses segment are reading eyeglasses. In preferred embodiment, the eyeglasses container segment is a hollow plastic tube or a box. In preferred embodiments, the eyeglasses container has thereon an attachment device. In other preferred embodiments, the attachment device is double-sided tape. In preferred embodiments, the linking device is a chain, string or a wire. In preferred embodiments, the linking device is configured to attach and detach from the eyeglasses segment and the eyeglasses container segment.

DETAILED DESCRIPTION

Figure 1:
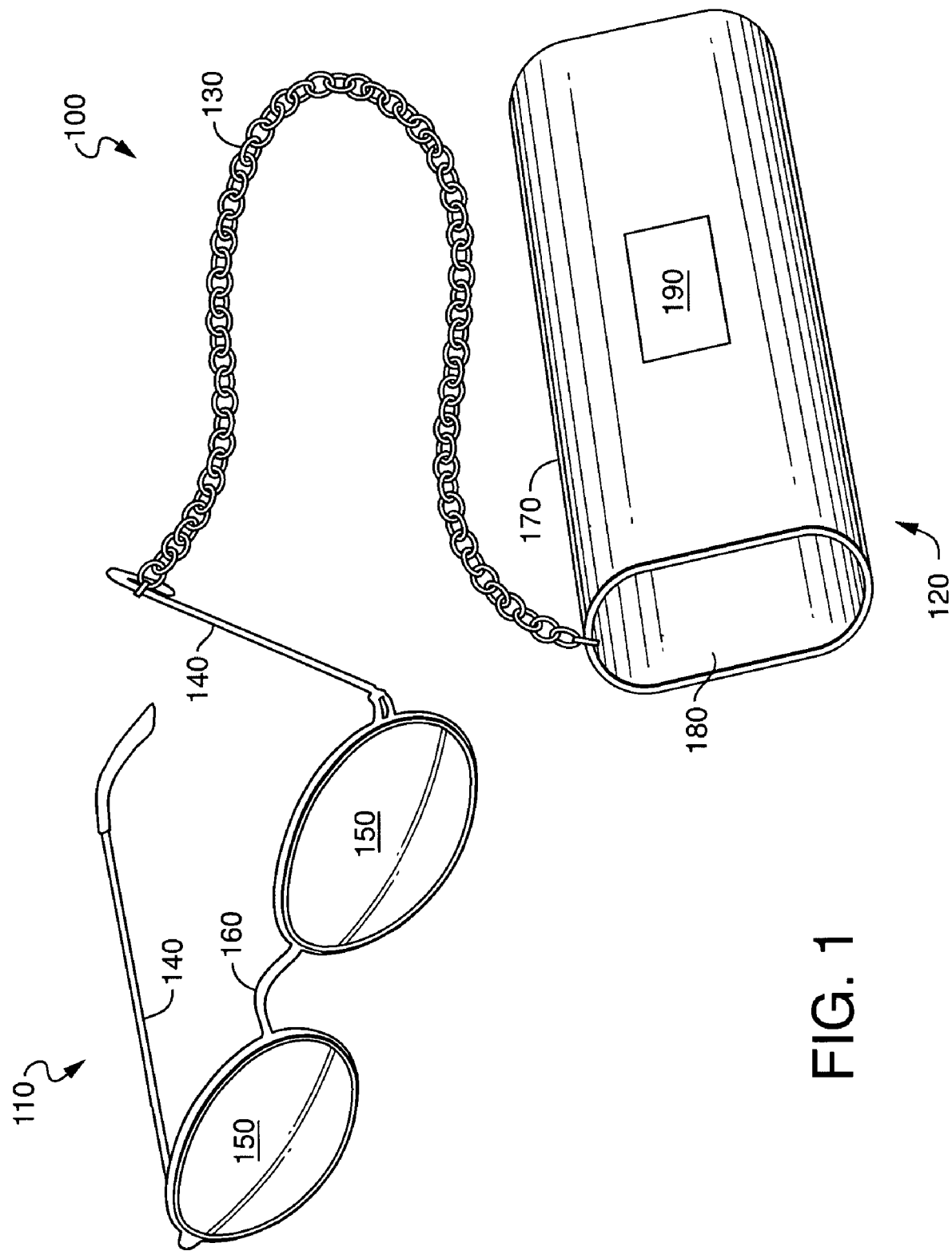
FIG. 1 shows an eyeglasses device embodiment of the present invention.

The following discussion relates to an eyeglasses device comprising eyeglasses connected to a containing segment. FIG. 1 illustrates a preferred embodiment of the device of the present invention. The present invention is not limited to this particular embodiment.

The eyeglasses devices of the present invention are applicable for use in any setting where eyeglasses are prone to be lost (e.g., a bedroom, an office, an automobile, etc.). The eyeglasses device permits the containment of eyeglasses to a particular location, thereby prevent the accidental losing of the eyeglasses. The eyeglasses devices of the present invention provide numerous advantages over regular eyeglasses including, but not limited to, an misplacement-proof design. The present invention is not limited to any particular mechanism. Indeed, an understanding of the mechanism is not necessary to practice the present invention. Nevertheless, it is contemplated that the eyeglasses devices of the present invention function on the principle that upon securing the eyeglasses container to a location (e.g., a table), the eyeglasses cannot be misplaced due to the attachment between the eyeglasses and the eyeglasses container (described in more detail below).

FIG. 1 shows an eyeglasses device embodiment of the present invention. In some embodiments, the eyeglasses device 100 generally comprises an eyeglasses segment 110, an eyeglasses container segment 120, and a linking segment 130. The eyeglasses device 100 is not limited to a particular size. In preferred embodiments, the size of the eyeglasses device 100 is such that it is able to fit within a small area (e.g., briefcase, a drawer, a pocket). In preferred embodiments, the eyeglasses device 100 is configured to for simultaneous use by a user (e.g., a person requiring eyeglasses) and attachment to a location (e.g., a table) (described in more detail below).

Still referring to FIG. 1, the eyeglasses device 100 is not limited to a particular type of eyeglasses segment 110. In some embodiments, the eyeglasses segment 110 is a spectacle. In other embodiments, the eyeglasses segment 110 is reading glasses. In other embodiments, the eyeglasses segment 110 is sunglasses. In other embodiments, the eyeglasses segment 100 is prescriptive or non-prescriptive eyeglasses. The eyeglasses segment 110 is not limited to particular size dimensions. In preferred embodiments, the size of the eyeglasses segment 110 is such that it is able to fit within the eyeglasses container 120 (described in more detail below).

In preferred embodiments, as shown in FIG. 1, the eyeglasses segment 110 comprises eyeglasses arms 140, eyeglasses lenses 150, and an eyeglasses bridge 160. The eyeglasses segment 110 is not limited to a particular type or size of eyeglasses arms 150. The eyeglasses arms 150 are not limited to a particular shape. In preferred embodiments, the eyeglasses arms 150 are configured to fit over a user's ears. In preferred embodiments, the eyeglasses arms 150 are configured to fold such that the eyeglasses segment 110 is able to fit within the eyeglasses container 120 (described in more detail below).

Still referring to FIG. 1, the eyeglasses segment 110 is not limited to a particular type or size of eyeglasses lenses 150. In some embodiments, the eyeglasses lenses 150 are prescriptive lenses. In other embodiments, the eyeglasses lenses 150 are non-prescriptive. In other embodiments, the eyeglasses lenses 150 are sunglass lenses. The eyeglasses bridge 160 is not limited to a particular type or size.

Still referring to FIG. 1, the eyeglasses segment 110 is not limited to a particular type of eyeglasses bridge 160. In preferred embodiments, the eyeglasses bridge 160 is positioned between the eyeglasses lenses 150 such that it connects the eyeglasses lenses 150.

Still referring to FIG. 1, the eyeglasses device 100 is not limited to a particular type of eyeglasses container 120. The eyeglasses container 120 is not limited to a particular material composition (e.g., wood, plastic, metal, or mixture thereof). In preferred embodiments, the material composition of the eyeglasses container 120 is plastic. In preferred embodiments, the eyeglasses container 120 comprises an eyeglasses container body 170. In preferred embodiments, the eyeglasses container body 170 is a hollowed cylindrical container. In other embodiments, the eyeglasses container body 170 is a hollowed rectangular container. The eyeglasses container body 170 is not limited to particular size dimensions. In preferred embodiments, the size of the eyeglasses container body 170 is such that it is able to fit the eyeglasses segment 110. In preferred embodiments, the eyeglasses container body 170 has therein an eyeglasses container body opening 180. The eyeglasses container body opening 180 is not limited to particular size dimensions. In preferred embodiments, the eyeglasses container body opening 180 is sized such that the eyeglasses segment 110 are able to fit within the eyeglasses container body opening 180.

Still referring to FIG. 1, the eyeglasses container 110 has thereon an attachment agent 190. The eyeglasses container 110 is not limited to particular attachment agent 190. In preferred embodiments, the attachment agent 190 is Velcro. In other preferred embodiments, the attachment agent 190 is doubled sided tape. The attachment agent 190 is not limited to a particular size or shape. The attachment agent 190 is not limited to a particular position location on the eyeglasses container 120. In preferred embodiments, the attachment agent 190 is positioned on the exterior of the eyeglasses container 120. In preferred embodiments, the attachment agent 190 is attached to a location (e.g., table) such that the eyeglasses container 120 is secured to the location.

Still referring to FIG. 1, the eyeglasses device 100 is not limited to a particular linking segment 130 (e.g., chain, wire, string, tape, cord, etc.). In preferred embodiments, the linking segment 130 is a chain. The linking segment 130 is not limited to a particular length (e.g., 1 inch, 5 inches, 10 inches, 20 inches, etc.). In preferred embodiments, the length of the linking segment 130 is 18 inches. In preferred embodiments, the length of the linking segment 130 is such that a user is able to comfortably use the eyeglasses segment 110 while the eyeglasses container 120 is secured to a location.

Still referring to FIG. 1, the linking segment 130 connects with the eyeglasses segment 110 and the eyeglasses container 120. The linking segment 130 is not limited to a particular connection location with the eyeglasses segment 110. In preferred embodiments, the linking segment 110 connects with the eyeglasses segment 110 at an eyeglasses segment arm 140. The linking segment 130 is not limited to a particular connection location with the eyeglasses container 120. In preferred embodiments, the linking segment 130 connects with the eyeglasses container 120 along the exterior of the eyeglasses container 120. The linking segment 130 is not limited to a particular method of attachment (e.g., glue, snap, soddering). In preferred embodiments, the linking segment 130 is configured to attach and detach from the eyeglasses segment 110 and the eyeglasses container 120. The linking segment 130 is not limited to a particular manner of attaching and detaching from the eyeglasses segment 110 and the eyeglasses container 120 (e.g., velcro attachment/detachment, snap attachment/detachment, button attachment/detachment, etc.).

All publications and patents mentioned in the above specification are herein incorporated by reference. Although the invention has been described in connection with specific preferred embodiments, it should be understood that the invention as claimed should not be unduly limited to such specific embodiments. Indeed, various modifications of the described modes for carrying out the invention that are obvious to those skilled in the relevant fields are intended to be within the scope of the following claims.

I claim:

1. A device, comprising:
    an eyeglasses segment,
    an eyeglasses container segment, and
    a linking segment connecting said eyeglasses segment and said eyeglasses container segment, said linking segment having a first end comprising a detachable means for connecting said linking segment to said eyeglasses and a second end, wherein said second end attaches onto said eyeglasses container segment.

2. The device of claim 1, wherein said eyeglasses segment are reading glasses.

3. The device of claim 1, wherein said eyeglasses container segment is a hollow plastic tube.

4. The device of claim 1, wherein said eyeglasses container segment is a box.

5. The device of claim 1, wherein said eyeglasses container segment has thereon a attachment device.

6. The device of claim 5, wherein said attachment device is double sided tape.

7. The device of claim 1, wherein said linking segment is a chain.

8. The device of claim 1, wherein said linking segment is a string.

9. The device of claim 1, wherein said linking segment is a wire.

* * * * *